June 7, 1960 M. S. BURGIN 2,939,585
HAT HOLDER

Filed June 18, 1956 2 Sheets-Sheet 1

INVENTOR.
Miller S. Burgin.
BY
Fishburn and Gold
ATTORNEYS.

June 7, 1960     M. S. BURGIN     2,939,585
HAT HOLDER
Filed June 18, 1956     2 Sheets-Sheet 2
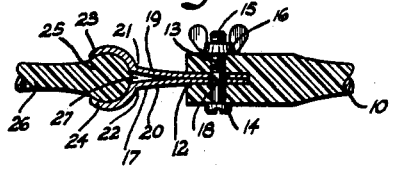
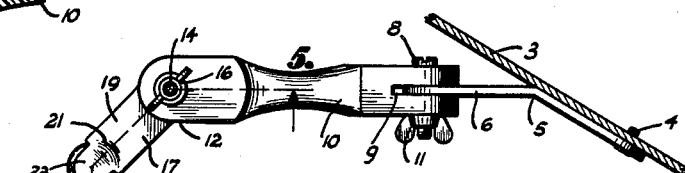
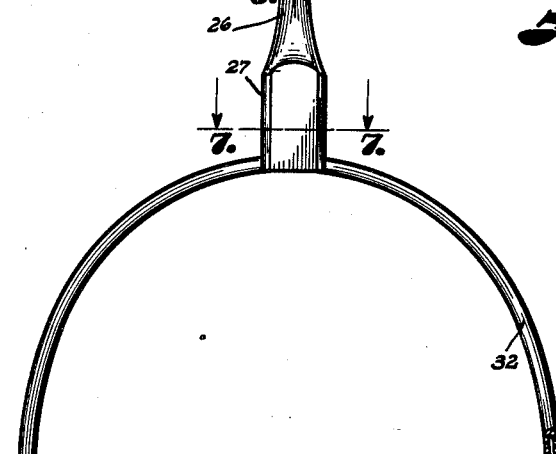
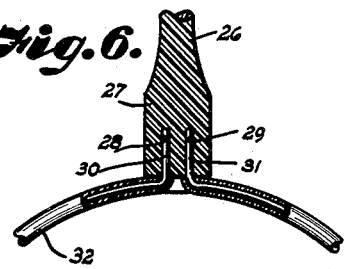
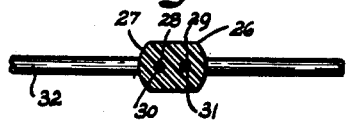
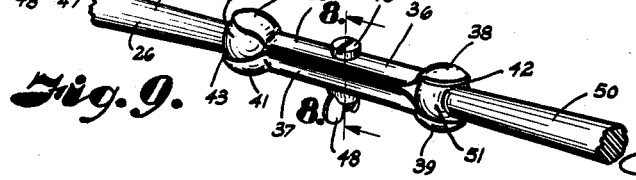
INVENTOR.
Miller S. Burgin.
BY
ATTORNEYS.

— # United States Patent Office 2,939,585
Patented June 7, 1960

2,939,585
HAT HOLDER

Miller S. Burgin, 5215 Rockhill Road, Kansas City, Mo.

Filed June 18, 1956, Ser. No. 592,203

1 Claim. (Cl. 211—32)

This invention relates to hat holders, and more particularly to a hat holder for fastening to the inside of an automobile or the like.

Hat holders have been devised for use in the enclosed body of a vehicle but such devices have been unsatisfactory due to mechanisms thereof which were cumbersome and hard to secure to the interior of such vehicle.

It is the principal object of the present invention to provide a hat holder for the inside of a passenger vehicle or the like which may be secured to the paneling on the inside of the automobile near the top where it is desired to hang the hat by removing a screw from the paneling and then inserting the screw through the bracket of the hat rack and thus secure the rack to the interior of the vehicle.

Other objects of the present invention are to provide means for securing the hat rack to the interior of a vehicle; to provide the fastening means with a pivoted member having a universal link connection with an arm carrying the ring for engaging the brim of the hat for retaining the hat in the holder; to provide a hat holder for attachment to the interior of a passenger vehicle so that the hat may be out of the way of the occupants of the vehicle and may be folded to require a small space when not in use; to provide a removable circular member for engaging the brim of the hat; and to provide a device of this character simple and economical to manufacture.

In accomplishing these and other objects of the invention I have provided improved details of structure the preferred forms of which are illustrated in the accompanying drawings, wherein:

Fig. 3 is a plan view showing the holder in partly folded position.

Fig. 5 is a longitudinal cross sectional view of the universal link taken on a line 5—5, Fig. 3.

Fig. 6 is a cross sectional view taken on a line 6—6, Fig. 2.

Fig. 7 is a cross sectional view taken on a line 7—7, Fig. 3.

Fig. 8 is a cross sectional view of a modified form of link or connecting member for the arms taken on a line 8—8, Fig. 9.

Fig. 9 is a fragmentary perspective view of the link member showing the universal connection with the arm.

Figure 1:
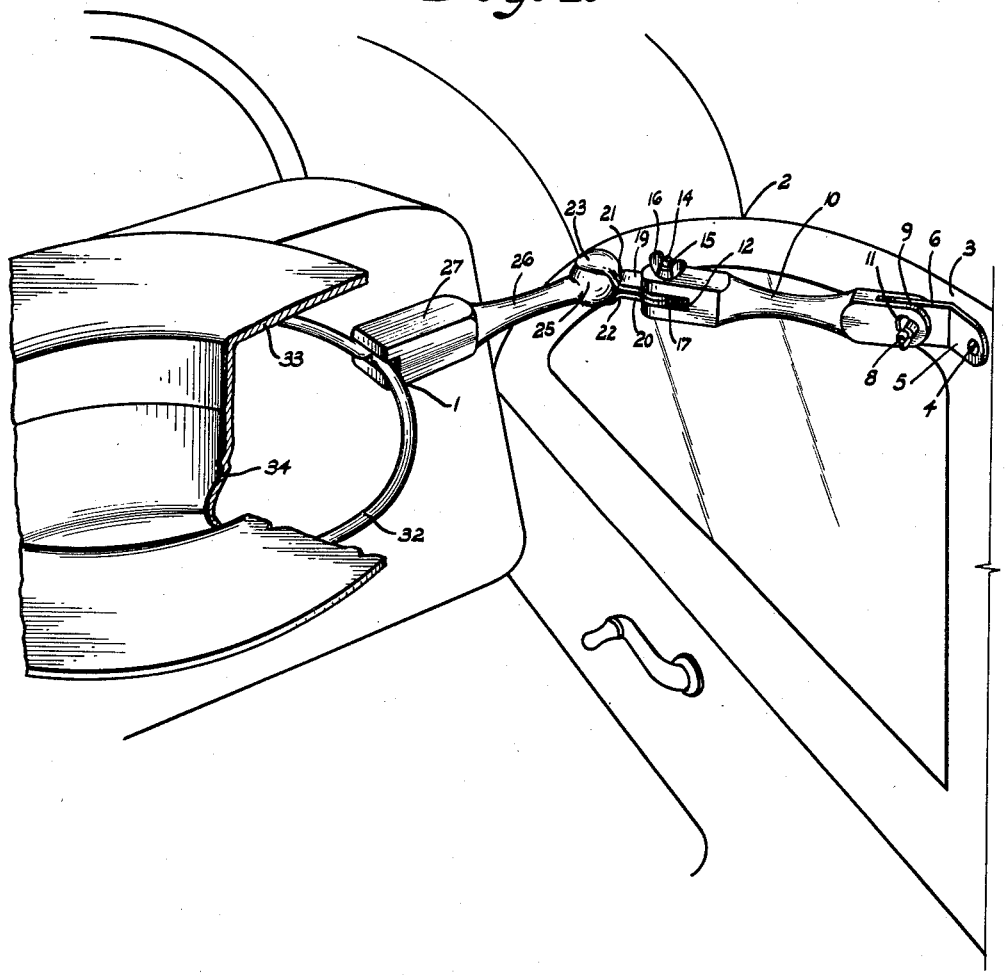
Fig. 1 is a perspective view of my invention shown attached to the interior of a vehicle with part of the hat broken away to illustrate the circular holder member.
Figure 2:
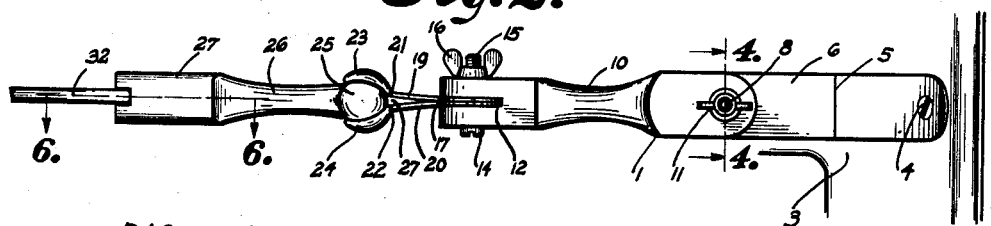
Fig. 2 is a fragmentary side view of the device.
Figure 4:
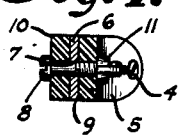
Fig. 4 is a cross sectional view taken on a line 4—4, Fig. 2.

Referring more in detail to the drawings:

1 designates a hat holder embodying the features of my invention for attachment to the interior of a passenger vehicle, or the like, as indicated at 2. Most vehicles have a paneling as indicated at 3 on the inside near the top thereof and secured thereto by screws or the like 4. The screw 4 may be removed and a bracket 5 secured to the paneling by the screw 4 as best illustrated in Fig. 1. The bracket has an arm portion 6 bent slightly at an angle provided with an opening 7 adapted to receive a bolt or the like 8 for fastening the bifurcated end 9 of an arm 10 pivotally to the arm 6. The bolt 8 is screw fitted and adapted to receive a wing nut 11 for tightening of the bifurcated ends of the arm 10 to hold the arm in adjusted position on the bracket 5. The arm 10 has its opposite end bifurcated as indicated at 12 provided with openings 13 for a bolt 14 having threads 15 for a wing nut 16, said bifurcated end 12 being right angular to the opposite bifurcated end 9.

Secured within the bifurcated end 12 is a flexible clip or link 17, preferably shown as two plates, having aligned openings 18 as indicated in Fig. 5, through which the bolt 14 extends. The plate members 17 continue into flat arms 19 and 20 which extend from the bifurcated end 12 and then are flared outwardly as indicated at 21 and 22 to form sockets 23 and 24 for receiving the substantially spherical end 25 of an arm 26 to form a universal joint between the arm 26 and the ball joint clip 17. By inserting the spherical end 25 within the sockets 23 and 24 the arms 19 and 20 will be spaced slightly apart as indicated at 27, thus allowing a tight fit of the sockets on the sphere 25 by tightening the wing nut 16. The free end of the arm 26 is enlarged and is substantially rectangular shape with slightly curved sides as indicated at 27 (Fig. 7) and is provided with spaced, longitudinally extending bores 28 and 29 adapted to receive the ends 30 and 31 of a ring member 32 adapted to engage the brim 33 of a hat 34 to hold the hat in an upside down position as illustrated in Fig. 1. The ring member 32 is removably attached to the arm 26 to provide for easy assembly of the device and for packaging the same for shipment as well as attachment of the ring to the hat if desired before securing the ring to the arm 26.

It will be obvious that the arm may be adjusted to any desired position through the pivoted arm 10 and pivoted clip or link 17 as well as the universal connection of the arm 26 with the end of the link 17 by tightening of the nuts 11 and 15 on the bolts 8 and 14, and the hat may be held in the ring in an upside down position so that it will lie flat against the inside of the top of the car or in other positions as desired.

I do not wish to be limited to any particular attachment of the bracket 5 to the inside of the vehicle. It may be placed at various positions such as on the windshield between the driver's seat and the opposite side of the car or other places.

While I have found the arms 10 and 26 may be made of plastic, Lucite, or other similar material, I do not wish to be limited to any particular material as various materials such as aluminum, wood, or the like, may be utilized without parting from the spirit of my invention.

In Figs. 8 and 9 I have illustrated a modified form of a clip or link member designated 35 comprising parallel elongated members 36 and 37 flared outwardly at their respective ends as indicated at 38, 39, 40 and 41 forming sockets 42 and 43. Arms 36 and 37 are provided with aligned openings as indicated at 44 and 45 adapted to receive a bolt 46 having a threaded end 47 for a wing nut 48 for gripping the elongated members 36 and 37 together.

In this form of the invention the arm 49 will be the same as the arm 26 in the preferred form of the invention and particularly as illustrated in Fig. 3. The arm 50, corresponding to arm 10 of the preferred form, instead of having a bifurcated end as shown in Fig. 3 will have a spherical end 51 corresponding to the spherical end 52 on the arm 49 engaging in the sockets 42 and 43 respectively. By tightening of the wing nut 48 the clip may be secured tightly on the spherical member to hold the arms in any desired adjusted position.

It will be obvious from the foregoing that I have provided an improved hat holder for the inside of a vehicle which may be adjusted in any desired position and which may be folded out of the way of the occupants of the vehicle while attached to the car and also folded to a position for easy packaging and shipment.

What I claim and desire to secure by Letters Patent is:

A hat holder for attachment to the inside of a vehicle having a panel near the top thereof comprising, a bracket having a substantially flat laterally turned arm, means securing the bracket to said panel, a first arm having one end secured to said substantially flat arm of said bracket for swinging movement of said first arm in vertical axial alignment only with respect to said laterally turned arm and the other end terminating in parallel spaced ears, a link member, said link member having two parallel substantially flat arms, means pivotally securing the ends of said substantially flat arms between the spaced ears on said first named arm, a second arm, a spherical member on one end of said second arm, inwardly facing socket members on the other ends of said link arms for engaging said spherical member and holding said second arm in adjusted position, a head on the other end of said second arm having spaced longitudinally extending sockets, and a wire loop member having free ends for removably engaging in said sockets in said head and the said loop member engaging the brim of the hat to hold the same in adjusted position in the vehicle.

References Cited in the file of this patent
UNITED STATES PATENTS

| | | |
|---|---|---|
| 501,329 | Cotton | July 11, 1893 |
| 1,124,714 | Denning | Jan. 12, 1915 |
| 1,923,697 | Jankovic | Oct. 31, 1933 |
| 2,049,434 | Erickson | Aug. 4, 1936 |
| 2,467,041 | Konikoff | Apr. 12, 1949 |